UNITED STATES PATENT OFFICE.

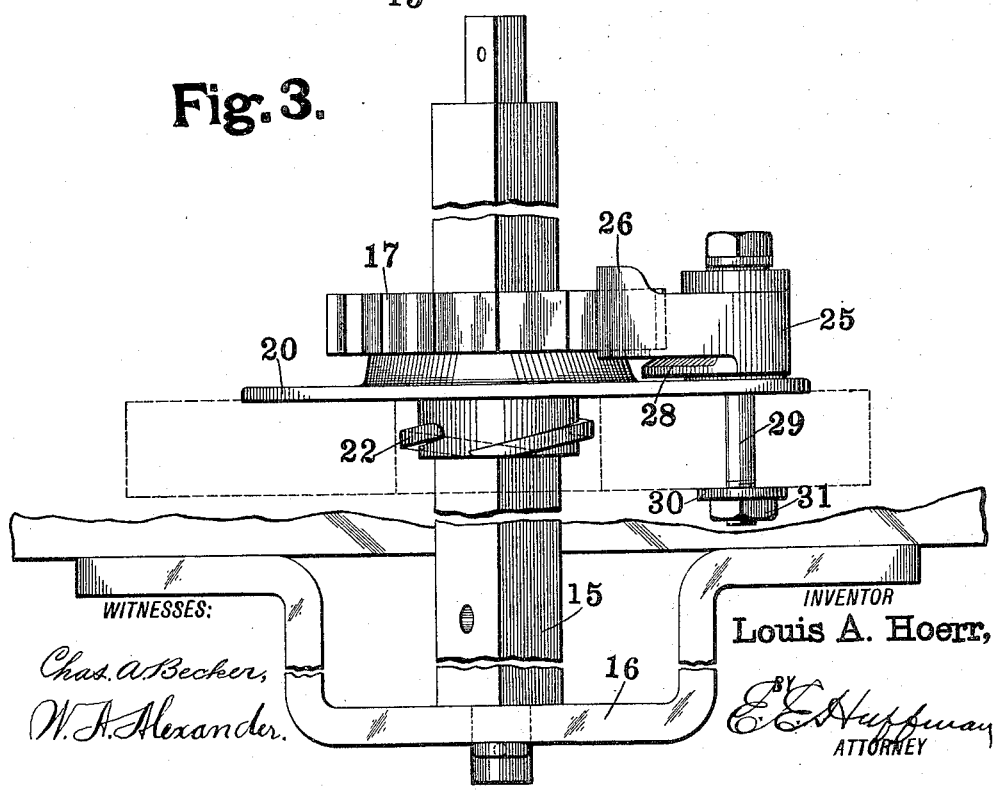

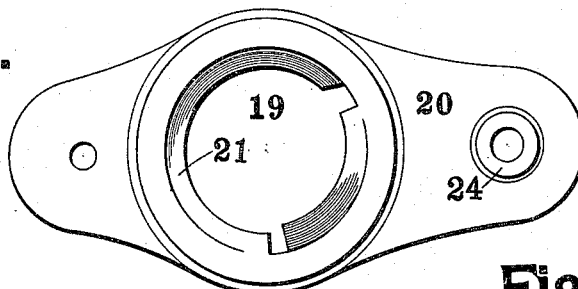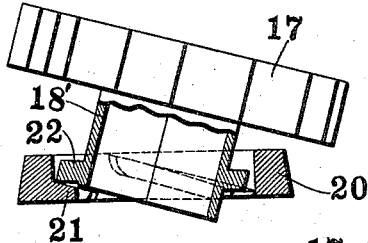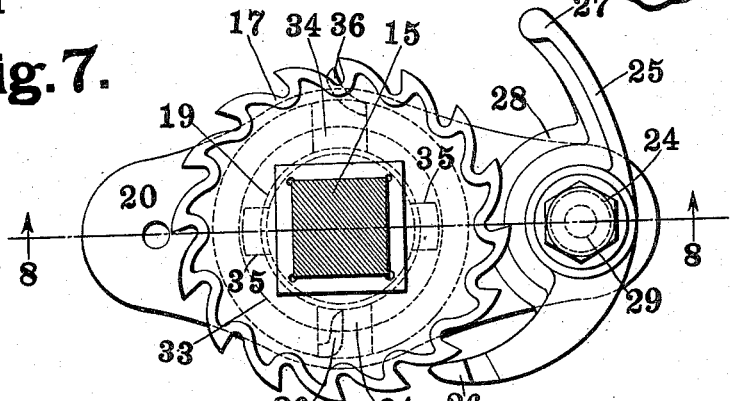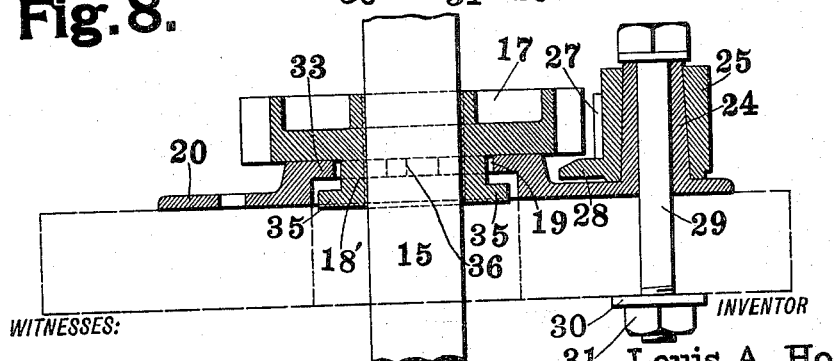

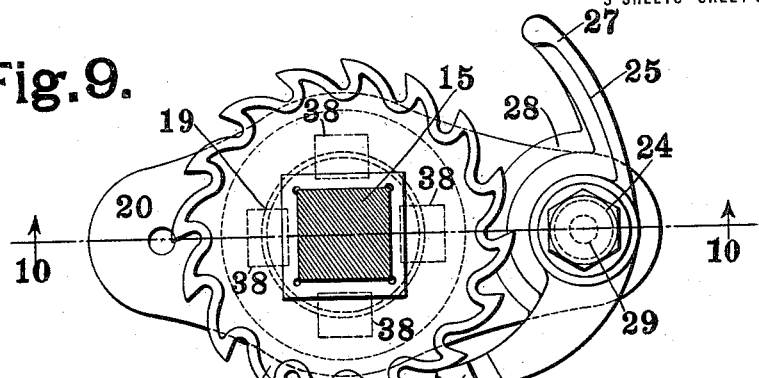
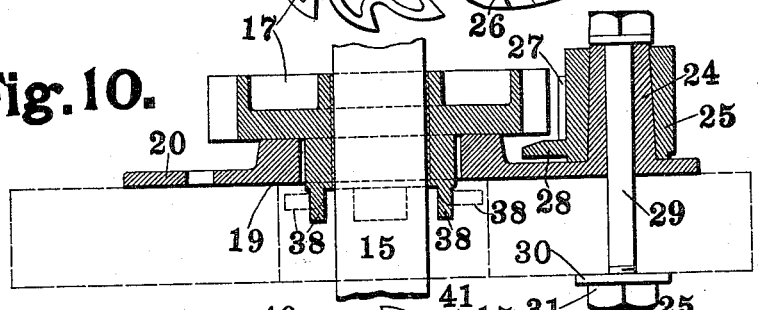
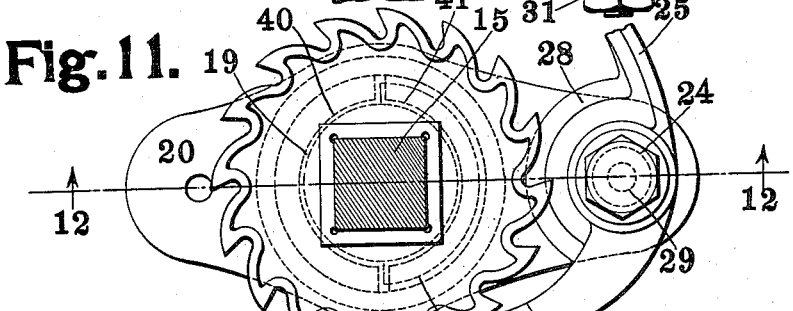
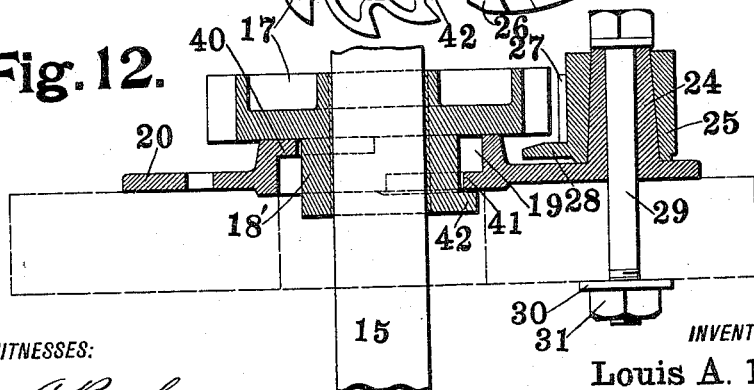

LOUIS A. HOERR, OF ST. LOUIS, MISSOURI.

BRAKE MECHANISM.

1,156,479.  Specification of Letters Patent.  Patented Oct. 12, 1915.

Application filed October 2, 1913. Serial No. 792,919.

*To all whom it may concern:*

Be it known that I, LOUIS A. HOERR, a citizen of the United States of America, residing at the city of St. Louis, State of Missouri, have invented a certain new and useful Brake Mechanism, of which the following is such a full, clear, and exact description as will enable any one skilled in the art to which it appertains to make and use the same, reference being had to the accompanying drawings, forming part of this specification.

My invention relates to a brake mechanism for railway cars and, more particularly, to the ratchet and pawl for the brake staff.

The object of my invention is to provide means for rigidly connecting the ratchet and pawl and, at the same time, prevent the accidental disconnection of either the ratchet or the pawl from the base plate upon which they are mounted.

In the accompanying drawings, which illustrate the preferred form of my invention together with certain modifications thereof, Figure 1 is a top plan view showing my preferred form; Fig. 2 is a section taken on the line 2—2 of Fig. 1; Fig. 3 is a side elevation; Fig. 4 is a top plan view of the base plate; Fig. 5 is a view partly in section and partly in elevation, showing the manner of attaching the ratchet to and detaching it from the base plate; Fig. 6 is a bottom plan view of a portion of the ratchet wheel; Fig. 7 is a top plan view showing a slight modification; Fig. 8 is a section taken on the line 8—8 of Fig. 7; Fig. 9 is a top plan view showing another modification; Fig. 10 is a section taken on the line 10—10 of Fig. 9; Fig. 11 is a top plan view showing a further modification; and Fig. 12 is a section taken on the line 12—12 of Fig. 11.

Like marks of reference refer to similar parts in the several views of the drawings.

15 represents a brake staff which is square in cross section. The bottom end of the brake staff 15 is secured in a suitable stop 16, shown in Fig. 3, in the usual manner. Surrounding the brake staff 15 is a ratchet wheel 17 which is provided with a square opening 18, as shown in Fig. 6, corresponding in size and shape to the cross section of the brake staff 15. The ratchet wheel 17 is provided with a hub 18′ which is adapted to project through an opening 19 in a base plate 20 which is secured to the car in any suitable manner. The base plate 20 is provided with screw threads 21 and the wheel 17 with corresponding threads 22. These threads 21 and 22 in place of being formed concentrically with the axis of the brake shaft are arranged at a slight angle thereto so that, in order to engage or disengage the wheel 17 with the base plate 20, it is necessary to turn the two parts at a slight angle to each other as shown in Fig. 5. The threads 22 are formed only at the outer end of the hub 18 so that when the parts are in their normal position, as shown in Fig. 2, the hub will turn freely in the opening in the base plate 20. It will be evident from this construction that the wheel 20 can only be placed in position in the plate or removed therefrom when the brake staff 15 is withdrawn from the wheel. Formed on the base plate 20 is a boss 24 adapted to receive a pawl 25 having a working end 26 engaging with the teeth of wheel 17 and a toe-piece 27 for releasing the pawl from the wheel. The pawl 25 is also provided with a flange 28 which projects beneath the wheel 17 so as to limit the upward movement of the pawl when the wheel 17 is in position. A bolt 29 passes through the boss 24 and is provided with washers 30 and a nut 31. It will be evident that even if this bolt 29 is entirely removed, the flange 28 will hold the pawl in position so as to prevent its disengagement from the wheel. The working end 26 of the pawl 25 is made wider than the face of the ratchet wheel 17, as shown in Fig. 3. In this way, a certain amount of longitudinal movement is allowed between the ratchet and the pawl without reducing the amount of engaging surface between the two parts.

In Figs. 7 and 8, I have shown a slight modification in which the plate 20, instead of being provided with the thread 21, is provided with a flange 33 which is provided with openings 34, shown in dotted lines in Fig. 7. These openings 34 are adapted to allow the passage of lugs 35 formed on the hub 18 in place of the teeth 22 hereinbefore described. The base plate 20 is also provided with a pair of fingers 36 which stand in the position shown in the upper part of Fig. 7 before the parts are removed. After the parts are removed, however, these fingers 36 are bent into the position shown in the lower part of Fig. 7, so as to prevent the return of the lugs 35 through the opening 34.

In Figs. 9 and 10, I have shown another modification in which both the screw threads and the flange are omitted from the base plate 20 and the hub 18 is provided with downwardly projecting lugs 38 which are adapted to be bent into the position shown in dotted lines in Fig. 10 after the parts are removed so as to prevent the hub 18 from moving out of engagement with the plate 20.

In Figs. 11 and 12, I have shown a still further modification in which the base plate 20 is provided with a pair of flanges 40 and 41 respectively, which flanges each extend half way around the opening 19 and are arranged in different planes. In this construction, the hub 18 is provided with a flange 42 extending about half way around the same. In order to engage or disengage the wheel 17 from the plate 18 in this arrangement, it is necessary to turn the lug 42 to the side opposite the flange 40 and then rotate the wheel half a revolution and drop the lug past the flange 41. It will be evident that the wheel 17 cannot be lifted out of the plate 20 without the lug 42 striking over the flange 40 or the flange 41.

It will be evident that in my construction, the ratchet wheel and pawl are rigidly secured together by means of the base plate 20 and that neither the ratchet nor the pawl can become accidentally detached from the base plate even though the bolt 29 should be entirely omitted. It is also evident that a certain amount of longitudinal movement between the pawl and the ratchet wheel is possible without reducing the effective engaging surface between the two parts.

Having fully described my invention, what I claim as new and desire to secure by Letters Patent of the United States is:

1. The combination with a brake staff of a base plate having an opening through which said staff passes, a ratchet wheel surrounding said staff, said ratchet wheel being provided with a threaded hub adapted to project through said opening to prevent longitudinal movement.

2. The combination with a brake staff, of a base plate having an opening through which said staff passes, said ratchet wheel being provided with a threaded hub adapted to project through said opening and engage with the plate to prevent longitudinal movement, a pawl carried by said base plate and projecting beneath said ratchet wheel, a flange carried by said pawl and projecting beneath said wheel to prevent longitudinal movement of the pawl.

3. The combination with a brake staff, of a base plate having an opening through which said staff passes, said opening being provided with threads arranged at an angle to the axis of the staff, a ratchet wheel surrounding said staff, said ratchet wheel being provided with a hub adapted to project through said opening and having inclined threads to coöperate with the threads of said opening.

4. The combination with a brake staff, of a base plate having an opening through which said staff passes, said opening being provided with threads inclined to the axis of the brake staff, a ratchet wheel surrounding said staff, said ratchet being provided with a hub having inclined threads adapted to coöperate with the threads in said opening, a pawl carried by said base plate, and a flange on said pawl projecting beneath said wheel to prevent longitudinal movement of said pawl.

In testimony whereof, I have hereunto set my hand and affixed my seal.

LOUIS A. HOERR. [L. S.]

Witnesses:
W. A. ALEXANDER,
G. M. SHORE.

Copies of this patent may be obtained for five cents each, by addressing the "Commissioner of Patents, Washington, D. C."